United States Patent [19]
Macduff

[11] Patent Number: 5,383,227
[45] Date of Patent: Jan. 17, 1995

[54] METHOD FOR MODIFYING EXISTING TRANSITION PIECES IN BOTTOM ENTRY NUCLEAR FUEL ASSEMBLIES FOR REDUCING COOLANT PRESSURE DROP

[75] Inventor: Robert B. Macduff, Richland, Wash.

[73] Assignee: Siemens Power Corporation, Richland, Wash.

[21] Appl. No.: 110,642

[22] Filed: Aug. 23, 1993

[51] Int. Cl.[6] .................. G21C 3/30; G21C 15/00
[52] U.S. Cl. ............................. 376/261; 376/352; 376/443; 376/446
[58] Field of Search ............... 376/352, 364, 365, 446, 376/443, 175, 176, 261, 260

[56] References Cited

U.S. PATENT DOCUMENTS

| | | | |
|---|---|---|---|
| ,675,154 | 6/1987 | Nelson et al. | 376/444 |
| 2,961,393 | 11/1960 | Monson | 376/352 |
| 2,990,349 | 9/1955 | Roman | 204/154.2 |
| 3,060,111 | 10/1962 | Sherman et al. | 376/352 |
| 3,070,537 | 12/1962 | Treshow | 204/193.2 |
| 3,087,881 | 4/1963 | Treshow | 376/352 |
| 3,099,616 | 7/1963 | Bauer et al. | 376/352 |
| 3,127,320 | 3/1964 | Hainzelin et al. | 176/19 |
| 3,161,571 | 12/1964 | Harrer et al. | 376/352 |
| 3,308,032 | 3/1967 | Berthod | 176/62 |
| 3,712,341 | 1/1973 | Constantin et al. | 376/352 |
| 3,816,247 | 6/1974 | Cayol et al. | 376/352 |
| 3,873,419 | 3/1975 | Sletten | 176/61 |
| 4,348,353 | 9/1982 | Christiansen et al. | 376/364 |
| 4,366,116 | 12/1982 | Christiansen et al. | 376/446 |
| 4,420,458 | 12/1983 | Dunlap et al. | 376/447 |
| 4,526,744 | 7/1985 | Borrman et al. | 376/446 |
| 4,526,746 | 7/1985 | Fredin | 376/444 |
| 4,557,892 | 12/1985 | Komoda | 376/412 |
| 4,560,532 | 12/1985 | Barry et al. | 376/434 |
| 4,632,804 | 12/1986 | Wallander et al. | 376/444 |
| 4,654,194 | 3/1987 | Christiansen et al. | 376/446 |
| 4,671,926 | 6/1987 | Broberg et al. | 376/364 |
| 4,708,846 | 11/1987 | Patterson et al. | 376/444 |
| 4,724,904 | 2/1988 | Fletcher et al. | 165/174 |
| 4,746,488 | 5/1988 | Pradal et al. | 376/352 |
| 4,826,653 | 5/1989 | Nylund et al. | 376/444 |
| 4,889,684 | 12/1989 | Johansson | 376/444 |
| 5,106,575 | 4/1992 | Nakamura et al. | 376/439 |
| 5,128,098 | 7/1992 | Nakamura et al. | 376/444 |
| 5,132,077 | 7/1992 | Bryan | 376/352 |

Primary Examiner—Behrend Harvey
Attorney, Agent, or Firm—Ira Lee Zebrak

[57] ABSTRACT

A method is provided for retrofitting nuclear fuel assemblies in bottom entry fuel assembly type nuclear reactors having a transition piece to guide liquid coolant into a channel entry area. The transition piece is disposed above an entry orifice in a fuel assembly support plate. The transition piece has side walls and a multi-pronged lead-in finger. The method comprises the steps of removing the lead-in finger from the transition piece, machining internal surfaces of the side walls of the transition piece and installing an insert to be disposed within and supported by the machined transition piece. The insert has walls with internal surfaces defining a first cylindrical portion with a constant diameter at least as large as the diameter of the orifice and disposed immediately above the orifice for allowing the flow stream from the orifice to fully enter the first portion and attach to the inner sides of the first portion and an outwardly flaring (conical or parabolic) second portion having a diameter which increases in the direction of fluid flow for allowing controlled expansion of fluid in the transition piece.

7 Claims, 5 Drawing Sheets

METHOD FOR MODIFYING EXISTING TRANSITION PIECES IN BOTTOM ENTRY NUCLEAR FUEL ASSEMBLIES FOR REDUCING COOLANT PRESSURE DROP

CROSS REFERENCE TO RELATED APPLICATIONS

Reference is made to the application entitled "Improved Transition Piece for Reducing Coolant Pressure Drop for Bottom Entry Nuclear Fuel Assemblies" filed simultaneous herewith.

BACKGROUND OF THE PRESENT INVENTION

1. Field of the Invention

The present invention relates to coolant flow transition pieces in bottom entry fuel assembly design reactors and, in particular, a method for modifying the design of existing transition pieces in such reactors to reduce coolant pressure drop.

2. Background Art

FIG. 1a illustrates a bottom entry fuel assembly 10 of the prior art typically used in BWR nuclear reactors. The assembly includes a number of nuclear fuel rods 11 disposed between upper and lower tie plates 12 and 13. The assembly includes at the bottom of the lower tie plate a transition section 15 for directing coolant into the fuel assembly. The transition section 15 is better shown in FIG. 1b with reference to the fuel assembly support plate 18. The transition section, hereafter referred to as the transition piece 15, may be either separate from the lower tie plate grid or it may be integral with the grid, dependent on the designed interface with the fuel channel.

Referring to FIG. 1b, the transition piece 15 between the fuel assembly and the fuel supporting plate 18 in such bottom entry nuclear fuel assemblies is subject to certain constraints. The top portion 16 must interface with a channel in a prescribed manner and is generally square in shape. The portion 17 of the transition piece extending downward to the fuel assembly support plate 18 in FIG. 1b is generally round and must seat in a specific diameter opening of specific depth. The distance between the fuel assembly support plate 18 and the fuel assembly itself is defined. Related dimensions of one prior art design are also indicated on FIG. 1b. In this figure, A indicates the portion of the transition piece going from round to square.

In the prior design as shown in FIGS. 1a and 1b, the lower end of the transition piece 15 comprises a three-prong lead in finger 19 which is located just above the orifice 20 when the transition piece 15 is seated on the fuel assembly support plate 18. This prior arrangement allowed uncontrolled expansion of the coolant flow which resulted in a time varying jet of fluid from the orifice. This in turn contributed to fuel rod and water rod vibration which resulted in failure of lower end caps.

In this prior design, in particular, as the flow field passes through the opening in the fuel support plate, it narrows in diameter and then expands. The primary portion of the flow field remains at a velocity typical of the orifice cross section and requires several orifice diameters of downstream motion before the boundaries of the jet expand to contact the inner wall in the known standard transition piece. Because the jet does not expand to contact with the transition piece, it oscillates from side to side within the transition piece. With higher flow rates, the length of the identifiable flow field from the orifice becomes longer, i.e., more down stream diameters of flow are required to achieve contact with the standard transition piece. The oscillatory behavior of the flow field occurs over the entire length of the transition piece for flows typical of the central orifice regions of bottom entry fuel assembly type reactors.

Experiments have been performed to observe the flow passing through an orifice and standard transition piece. These experiments confirm the oscillatory behavior of the jet entering the transition piece, i.e., the jet fails to re-attach to the transition piece and fluctuates from side to side. The retention of an identifiable oscillatory flow field in the transition piece is a factor contributing to mechanical wear on the end caps of the water rods and fuel rods which seat on the lower tie plate immediately downstream of the end of the transition piece. Experiments confirm the mechanical wear on end caps in the presence of the oscillatory jet. In-reactor wear on the end caps has been observed and water rods have been observed to become disengaged from the lower tie plate due to the wear on the end caps.

While various shapes of transition pieces are known in the prior art, none have addressed the particular problem in bottom entry fuel assembly reactor designs as discussed above.

OBJECTS AND SUMMARY OF THE INVENTION

It is accordingly an object of the invention to provide a method for modifying a transition piece in bottom entry fuel assembly design reactors which avoids the problems of the prior art.

It is a further object of the present invention to provide a method for modifying existing transition pieces in such reactors to provide an arrangement which reduces vibration and end cap wear of the nuclear fuel assembly.

It is a still further object of the present invention to provide a method for modifying existing transition pieces in bottom entry fuel assembly reactors to provide a transition piece with appropriate diameter, length and expansion angle such that the jet from the orifice provided in the fuel assembly support plate reattaches to the transition piece and expands in a controlled manner in the lower tie plate of the fuel assembly thereby mitigating any time varying path of the coolant and possible vibrations.

In accordance with the invention, a method is provided for retrofitting prior design transition pieces for unirradiated nuclear fuel assemblies in bottom entry fuel assembly reactors having a transition piece to guide liquid coolant into a channel entry area. The transition piece functions to guide liquid coolant into a channel entry area and is disposed above an entry orifice in a fuel assembly support plate. The transition piece has side walls and a multi-pronged lead-in finger. The method comprises the steps of removing the lead-in fingers from the transition piece, machining internal surfaces of the side walls of the transition piece, and installing an insert to be disposed within and supported by the transition piece. The insert has walls having internal surfaces defining a first cylindrical portion with a constant diameter at least as large as the diameter of the orifice and disposed immediately above the orifice for allowing the flow stream from the orifice to fully enter the first portion and attach to the inner sides of the first portion and an outwardly flaring second portion having a diameter which increases with the flow direction for allowing controlled expansion of fluid in the transition piece.

For a better understanding of the present invention, reference is made to the following description and accompanying drawings while the scope of the invention will be pointed out in the appended claims.

BRIEF DESCRIPTION OF THE DRAWINGS

FIG. 1b is a partial cross-sectional side view of the lower portion of the fuel assembly of FIG. 1a.

DESCRIPTION OF THE PREFERRED EMBODIMENTS

As mentioned above, FIGS. 1a and 1b shows the construction of the presently used transition piece arrangement in bottom entry fuel assemblies in nuclear reactors. The following described embodiments discuss the method of modification of this transition piece arrangement which includes the essential detail of an insert to provide controlled expansion of fluid flow in accordance with the invention. In the description, like elements bear the same numerals throughout.

Figure 1A:
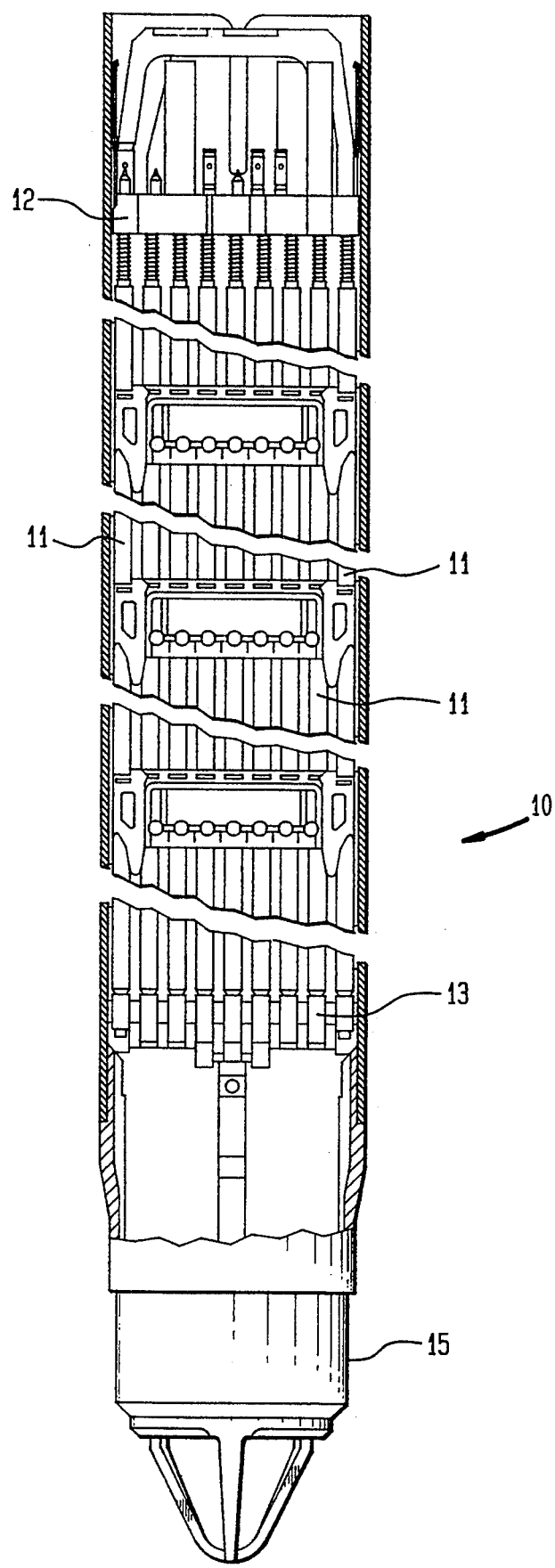
FIG. 1a is a cross-sectional side view of a bottom entry nuclear fuel assembly having a transition piece in accordance with the prior art.
Figure 2:
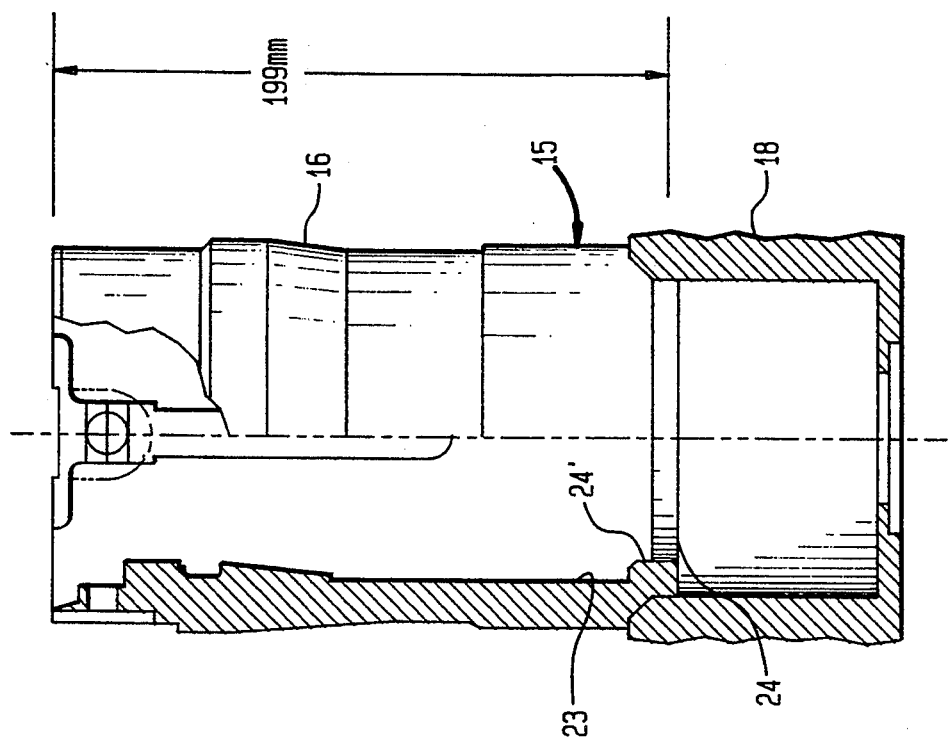
FIG. 2 illustrates a partial cross-sectional side view of the assembly in FIG. 1b following a first machining operation.
Figure 1B:
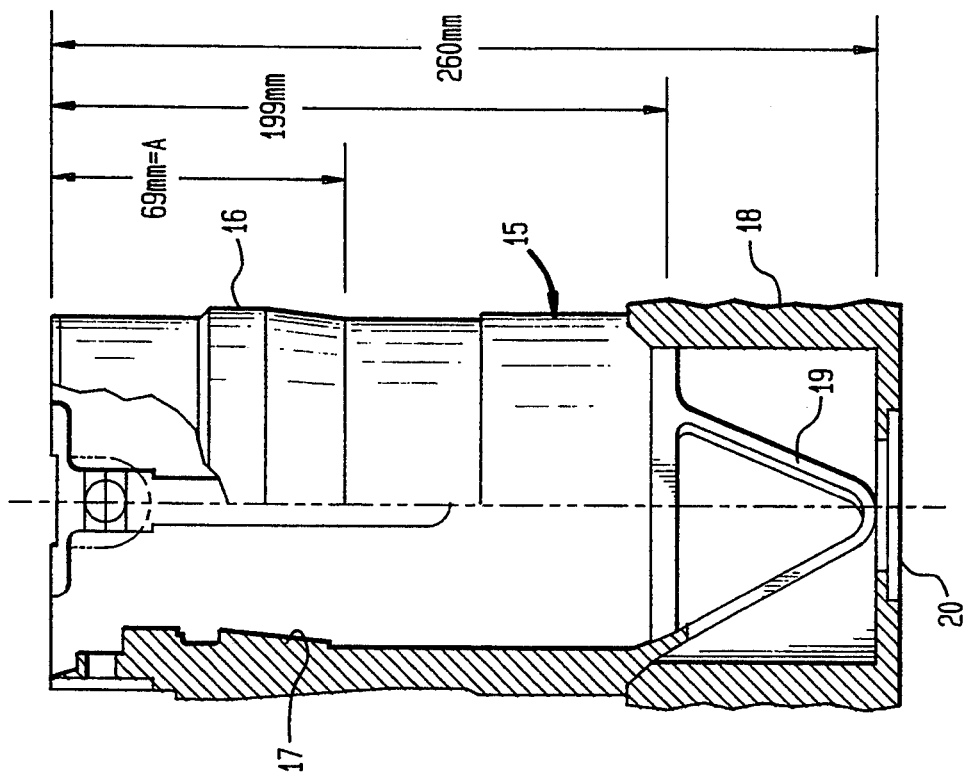

Referring to FIG. 2, the transition piece initially has the three-prong lead-in finger shown in FIG. 1b removed and then the interior surface of the remaining portion of the transition piece 15 is machined. The purpose of the machining is to enable the transition piece to receive an insert of appropriate design. FIG. 2 illustrates two of the surfaces 23 and 24 of the transition piece which are so machined. In the machining illustrated, the machining is performed from the top. It is within the scope of the invention however to provide alternative machining (not illustrated) wherein the transition piece is machined from the bottom. The steps of removing the finger and machining the transition piece is to assure a known geometry for the insert (to be described below). It should be noted that the lower portion of the machined transition piece includes a stepped element 24' upon which a portion of the insert will rest.

Figure 3:
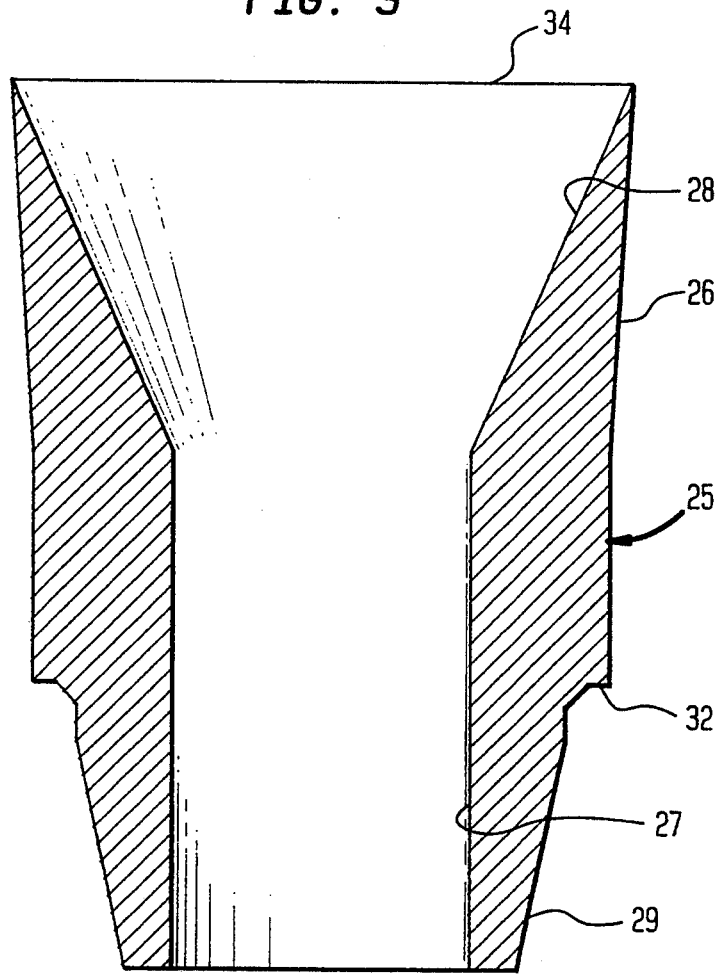
FIG. 3 illustrates a cross-sectional view of an insert in accordance with the invention for insertion in the assembly of FIG. 2.

Referring to FIG. 3, an insert 25 to be attached to the transition piece 15 is shown. Insert 25 performs the function of flow expansion control by using a constant diameter internal portion 27 followed (in the flow direction) by a conical section 28. Conical section 28 functions as a diffuser element in operation. The diameter of the conical section 28 increases in the flow direction. It should be understood that an outwardly curved or flaring section may also function in lieu of the conical section. The outer portion of the insert 25 piece 15 includes a lower tapered outer wall 29 and a constant diameter outer upper wall 26. Between the two is a lip portion 32 which functions in conjunction with the stepped portion 24' of the transition piece 15 to provide support for the insert. The constant diameter section 27 is appropriately sized with an initial inner diameter to allow the flow stream from the orifice to fully enter and attach to the sides of this portion. This diameter is at least as large as the diameter of the orifice.

The conical section 28 controls the expansion by prescribing an appropriate angle from the vertical for the conical section (15° for example) for controlled fluid expansion. As an alternative curved section, a parabolic surface may be used to flare outward for controlling the expansion process. The surface of the cone extends vertically upward and transitions into the existing maximum diameter 34 for example of the transition piece of about 3.94 inches (100–105 millimeters) for example. The constant diameter section 27, its diameter and length, and the conical angle or parabolic surface for expansion are central features of the invention. In a preferred arrangement, the internal diameter of the constant diameter section is about 53 mm and its length is 92 mm. A preferred axial length of the conical section is 91 mm. Because of the flow diffusion in a controlled manner, the pressure drop for the inlet region, including the orifice and transition piece will be significantly lower than the prior transition piece. Surface 29 is designated as the lead-in surface for the insert during assembly.

Figure 4:
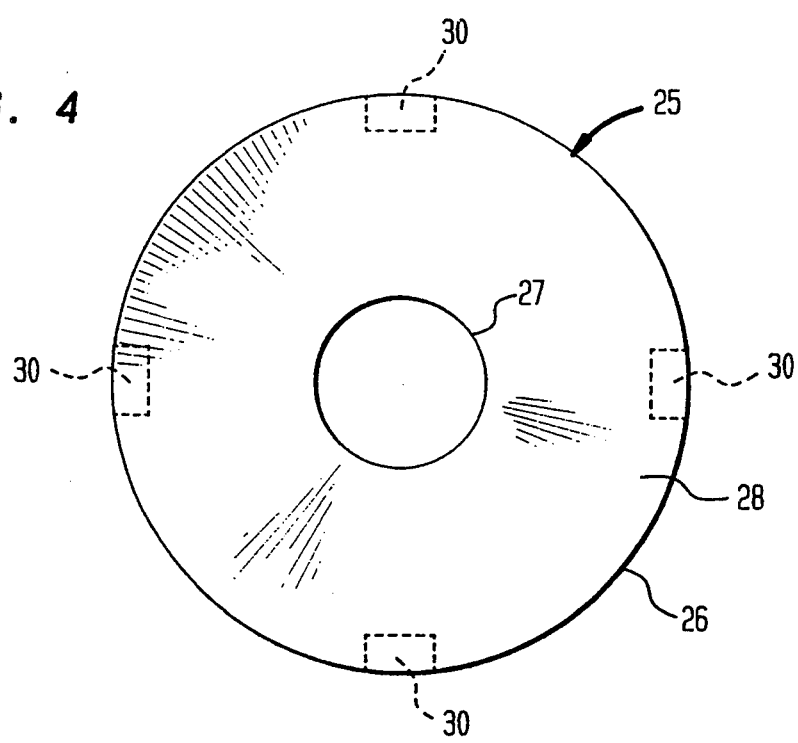
FIG. 4 illustrates a top view of the insert of FIG. 3.

A top view of the insert 25 is illustrated in FIG. 4 which shows the inclusion of fluid flow ventilation paths 30 between the insert 25 and the existing body of the transition piece. These venting paths 30 are intended to accomplish two purposes. One purpose is to assure some small seepage flow occurs from the upper portion of the diffuser (conical or curved portion) to the annular region between the lower portion of the insert and the fuel support device. This small seepage flow helps assure appropriate cooling within the gap that may be present between the insert and the existing body of the modified transition piece. The small seepage flow also assures that possible hold down effects due to pressure recovery of the nozzle are minimized.

Figure 5:
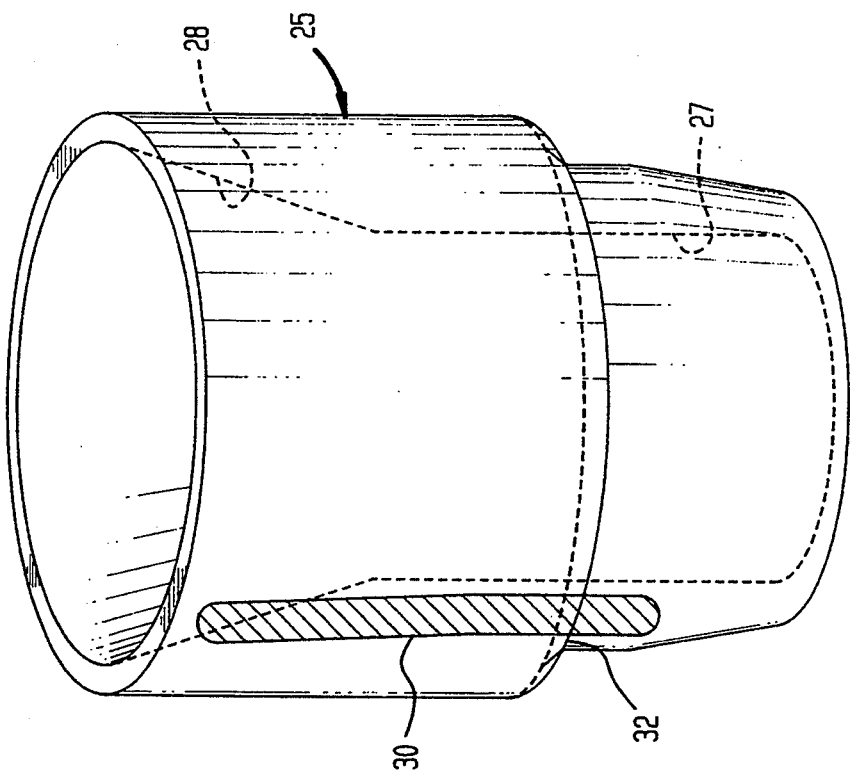
FIG. 5 illustrates a perspective view of the insert of FIG. 3 and FIG. 4 indicating optional vent paths in the insert.

FIG. 5 shows a perspective view of the insert 25 in accordance with the invention particularly indicating the location of the vent path 30. Also shown is the constant diameter portion 27, the conical section 28 and the lip 32.

Figure 6:
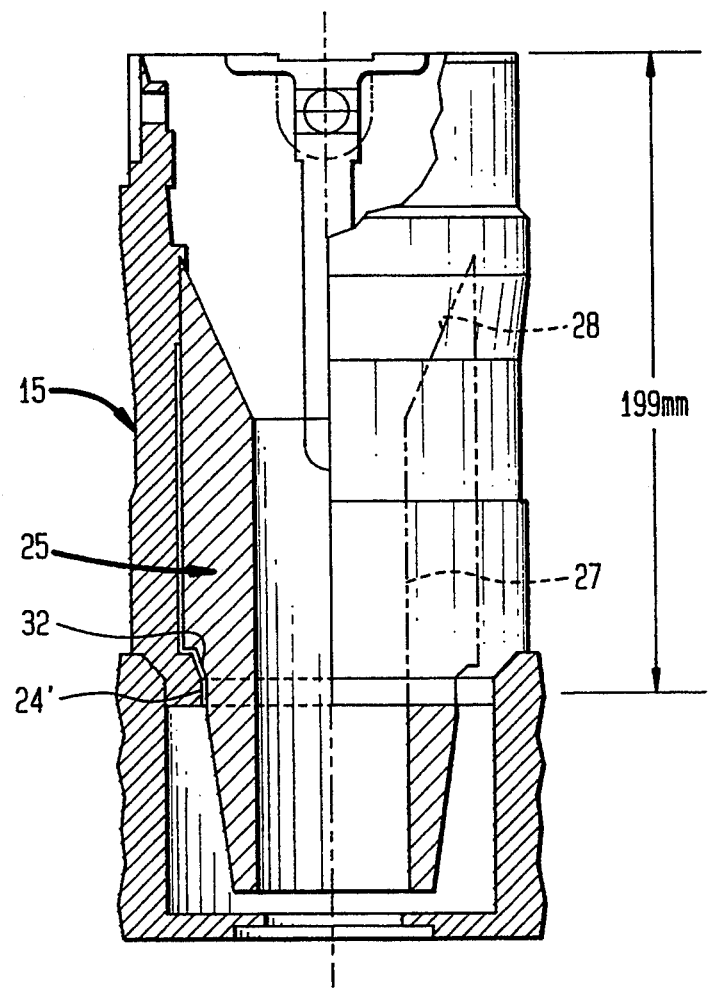
FIG. 6 illustrates a modified transition piece with an insert in accordance with the invention.

FIG. 6 illustrates the assembled modification showing insert 25 within the machined transition piece 15. In the assembled arrangement, lip 32 is seen to rest on the stepped portion 24' of the transition piece 15.

Figure 7:
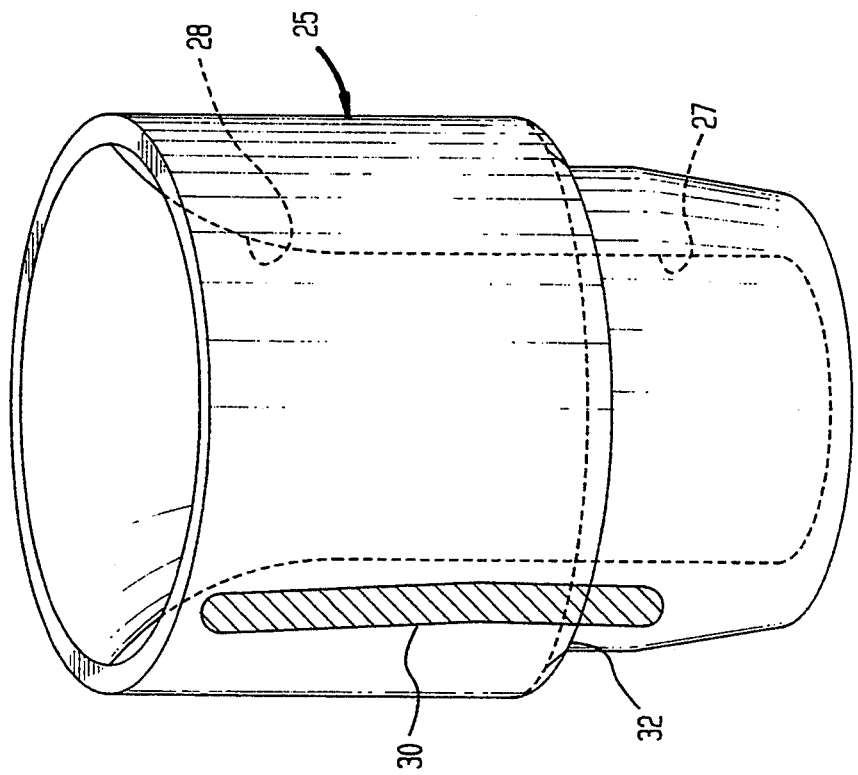
FIG. 7 illustrates a transition piece in accordance with the invention having an alternative scope.

A transition piece with an outwardly curved or flaring section is illustrated in FIG. 7.

With the method and insert in accordance with the present invention, a new design is provided which incorporates a fluid diffuser section to reduce the pressure drop associated with the transition piece for conventional fuel assembly applications in bottom entry fuel assembly type nuclear power plants and allows for retrofitting existing stock of transition pieces as shown in FIGS. 1a and 1b.

While an insert has been described and shown for insertion in the transition piece from the top, it is readily understood that different machining of the transition piece could allow insertion of the insert from the bottom. Further, while a conical expansion section has been shown and described, a parabolic or other suitably curved section can also be used for the diverging portion of the insert.

While the foregoing description and drawings represent the preferred embodiments of the present invention, it will be obvious to those skilled in the art that various changes and modifications may be made therein without departing from the true spirit and scope of the present invention.

What is claimed is:

1. A method for retrofitting nuclear fuel assemblies in bottom entry fuel assembly type nuclear reactors having a transition piece to guide liquid coolant into a channel entry area, said transition piece being disposed above an entry orifice in a fuel assembly support plate and having side walls and a multi-pronged lead-in finger, said method comprising the steps of:

removing the lead-in finger from the transition piece;

machining internal surfaces of the side walls of the transition piece; and installing an insert to be disposed within and supported by the machined transition piece, said insert having walls with internal surfaces defining a first cylindrical portion with a constant diameter at least as large as the diameter of the orifice and disposed immediately above the orifice for allowing the flow stream from the orifice to fully enter the first portion and attach to the inner sides of the first portion and an outwardly flaring second portion having a diameter which increases in the direction of fluid flow for allowing controlled expansion of fluid in the transition piece.

2. The method of claim 1 wherein said outwardly flaring second portion is conically shaped.

3. The method of claim 1 wherein said outwardly flaring second portion is parabolically shaped.

4. The method of claim 1 wherein outer surfaces of walls of the insert have venting paths.

5. The method of claim 2 wherein the conical second portion forms approximately a 15° angle from the longitudinal axis of the transition piece.

6. The method of claim 1 wherein the transition piece is machined to allow insertion of the insert from the top.

7. The method of claim 1 wherein the transition piece is machined to have a lower annular stepped portion and the insert includes an annular lip for resting on said stepped portion.

* * * * *